| United States Patent [19] | [11] Patent Number: 4,774,186 |
| Schaefer, Jr. et al. | [45] Date of Patent: Sep. 27, 1988 |

[54] MICROBIAL COMPOSITIONS AND METHODS FOR TREATING SOIL

[76] Inventors: Jimmie W. Schaefer, Jr., R.R. 4, Box 68; Kent W. Boyum, 501 W. Kirkwood Ave., both of Fairfield, Iowa 52556

[21] Appl. No.: 795,272

[22] Filed: Nov. 5, 1985

[51] Int. Cl.$^4$ .......................... C12N 1/12; C12N 1/04; C12R 1/89

[52] U.S. Cl. .................................... 435/257; 435/260; 435/946; 71/6; 71/903; 47/58

[58] Field of Search ...................... 47/1.4, 58; 71/1, 6, 71/903; 210/610; 435/257, 260, 946

[56] References Cited

U.S. PATENT DOCUMENTS

| 3,889,418 | 6/1975 | Porter et al. ............................. 47/58 |
| 3,958,364 | 5/1976 | Schenck et al. ................. 210/610 X |
| 3,969,844 | 7/1976 | Fogel et al. ............................. 47/58 |

OTHER PUBLICATIONS

Roger and Kulasooriya, *Blue-Green Algae & Rice*, (Manila, The International Rice Research Institute, 1980), pp. 81–86.
Venkataraman, *Algal Biofertilizers and Rice Cultivation* (New Delhi: Today and Tomorrow's Printers and Publishers, 1972), pp. 23–32; 39–53.
Venkataraman, *Phykos*, 5:164–174 (1968).
Venkataraman, *J. Gen. Appl. Microbiol.*, 7:96–99 (1961).
Watanabe, J. Gen. Appl. Microbiol., 5:153–157 (1959).
Singh, *Role of Blue-Green Algae in Nitrogen Economy of Indian Agriculture*, (New Delhi: Indian Council of Agricultural Research, 1961) pp. 67–106.
Lewin, *J. Gen. Microbiol.* 5:926–929 (1951).
Trainor, *Phycologia*, 9:111–113 (1970).
U.S. Pat. No. 4,229,544 issued Oct. 21, 1980 to Haynes et al.

*Primary Examiner*—Ferris H. Lander
*Attorney, Agent, or Firm*—Finnegan, Henderson, Farabow, Garrett & Dunner

[57] ABSTRACT

Microbiol compositions for uniform application to dry soil to provide a cover crop and to improve soil aggregation are disclosed. The compositions comprise flocculant-producing photosynthetic microorganisms, especially algae, in a dormant or resting stage mixed with a dry, particulate, water dispersible carrier. Methods for the production and use of the compositions are also disclosed.

7 Claims, No Drawings

MICROBIAL COMPOSITIONS AND METHODS FOR TREATING SOIL

BACKGROUND OF THE INVENTION

This invention relates to compositions containing photosynthetic microorganisms, preferably algae, for application to soil to provide a cover crop and to improve soil aggregation.

Cover crops are planted to improve the soil by adding organic matter, enhancing soil aggregation, controlling erosion, and improving moisture retention. They serve to improve the soil for the benefit of the cash crop. An example is red clover.

When plant material from cover crops decomposes, organic matter is added to the soil. When planted for this purpose, cover crops are known as green manure. Green manuring has been practiced in different forms, such as growing a legume crop in situ before planting the cash crop, simultaneous cultivation of a green manure and the cash crop, and addition of leaves and cuttings of plants or trees that have been grown elsewhere before or after planting the cash crop. Benefits credited to green manuring include increases in available plant nutrients and organic matter content and improvement in the microbiological and physical properties of the soil.

Traditional cover crops, however, have certain drawbacks that can outweigh their advantages. They can compete with the cash crop for moisture, nutrients, or sunlight, if grown with the cash crop. If grown in lieu of the cash crop, valuable land is taken out of production and the revenues that would results from the land being planted with the cash crop are lost. In addition, to provide the benefits of green manure, the conventional cover crop must be plowed under resulting in the farmer's expenditure of time and money for such things as fuel.

To overcome the disadvantages of traditional cover crops, microbial cover crops have been used. Certain photosynthetic microorganisms, especially algae, have been found to help control erosion, improve moisture retention, enhance soil aggregation, provide nutrients and organic matter to the soil, and reduce salinity. Algae cultures can be applied to the soil easily, for example, by mixing with water and spraying the suspension on the soil. Algae can also be grown at the same time as the cash crop with little competition for nutrients, space, sunlight, or moisture. The time for "planting" the algae to maturity, when it provides most of its benefits, is a matter of weeks rather than the months required to grow traditional cover crops. In addition, there is no need to plow the algae under for it to serve as a green manure.

Algae in the soil surface layers function autotrophically as green plants, utilizing their chlorophyll to convert carbon dioxide, nutrients, and inorganic nitrogen into cell substance by means of energy derived from sunlight. Soil algae are divided into Chlorophyta or green algae, Cyanophyta or blue-green algae, Bacillariophyta or diatoms, and Xanthophyta or yellow-green algae. Blue-green and green algae are the subject of the preferred embodiments of this invention. Blue-green algae are procaryotic, and many, but not all, species fix nitrogen. Green algae are eucaryotic and do not fix nitrogen. Some species of green or blue-green algae are unicellular and others are filamentous. Although algae usually reproduce asexually by cell fission, some types can also reproduce sexually.

It is known that many species of algae, particularly those of the families Chlorophyta and Cyanophyta, can survive dessication, sometimes for many years. Trainor, F. R., *Phycologia*, 9:111–113 (1970). Some species of algae, such as *Chlamydomonas mexicana*, under sexual reproduction when nutrients in the environment are depleted, which results in a cell type known as a zygospore that is very resistant to dessication. Lewin, R. A., *J. Gen. Microbiol.*, 5:926–929 (1951).

One of the important benefits of growing algae on soil is the modification of soil structure through the aggregation of soil particles. Bailey D., et al. *J. Phycol.*, 9:99–101 (1973), incorporated herein by reference. Improved soil aggregation leads to better root growth, better transport of nutrients, water, and gases in the root zone, decreased erosion, and better water retention. Preliminary observations of irrigated soil innoculated with *Chlamydomonas mexicana* indicated improved penetration and percolation of water, favorable crop response, and reduced erosion. Metting, B. et al., *Soil Science Soc. of Amer. J.*, 47:682–685 (1983), incorporated herein by reference.

Soil aggregation is caused by a mucus-like material excreted by the algae that binds soil particles. The material is believed to be composed primarily of polysaccharides, which are known to be flocculants. Little work has been done to characterize in detail these polysaccharides and any other substances that may be in the material. Thus, this application uses the terms "flocculant" and "flocculants" to characterize the soil aggregating material produced by algae and other photosynthetic microorganisms.

The use of certain types of algae in a method for treating soil to promote soil particle aggregation is disclosed in U.S. Pat. No. 3,969,844 to Fogel et al., issued July 20, 1976. Fogel et al. discloses a method comprising applying flocculant-producing algae to soil, culturing the algae under conditions favoring cell multiplication on the soil until a desired population density is reached, and thereafter continuing to culture the algae under conditions that favor the production of flocculants for a time sufficient to achieve the desired soil aggregating properties. In particular, certain algae, preferably those of the genus Chlamydomonas, especially the species *Chlamydomonas mexicana*, are cultured in nurse pools on a liquid nutrient medium under conditions that produce logarithmic or exponential growth. The cultures are harvested as an aqueous suspension which is then transported to the field and uniformly distributed on the soil to be treated. Nitrogen, other nutrients, and moisture are added or maintained in sufficient quantities so that the algae continue to multiply on the soil until a predetermined population density is reached. Then, the nutrients other than nitrogen are maintained, causing nitrogen to be depleted as the algae continue to grow. Thus, a state of nitrogen deficiency is created. This nitrogen deficient state, according to Fogel et al., promotes the production of the flocculants. Thus, Fogel et al. teaches that the creation of a nitrogen deficient state is critical to the production of algal flocculants.

The critical nature of the nitrogen deprivation step for enhancing the production of algal flocculants is also taught by U.S. Pat. No. 3,958,364 to Schenck et al., issued May 25, 1976. Schenck et al. discloses methods for the cultivation of algae for the production of flocculants. Preferred algae disclosed by Schenck et al. are those from the genus Chlamydomonas, preferably the species *Chlamydomonas mexicana,* and from the genus Chlorella, preferably the species *Chlorella pyrenoidosa.*

The soil treatment method of Fogel et al. presents significant disadvantages when actually used in the field. With respect to the nitrogen depletion step, there are a number of problems. Having to add nitrogen through the application of fertilizer for a particular period of time and then allowing a state of nitrogen deficiency to be created in time-consuming and not cost-effective for the farmer. Also, it is very difficult to monitor and control with available farm machinery the amount of available nitrogen in the top 1 to 2 centimeters of the soil, where the algae are concentrated.

Maintaining and transporting algae in the vegetative or growing stage also presents several problems. Contamination of the culture by undesired microorganisms is always possible when a large-volume liquid culture of algae is to be maintained. Furthermore, in order for the algae to remain viable, it is necessary for the nutrient supply to be constantly monitored and replenished as the culture grows. The cell population density of the culture must also be watched to assure that the algae are receiving adequate light. The addition of air and carbon dioxide is also required for long-term maintenance. Moreover, the storage and transportation of the large quantities of algae required for use as a soil conditioner is made more difficult and costly by the bulk of the liquid culture. At least half of the cost of transporting the product is attributable to this bulk and weight. Further, the maximum shelf life of such a product—the time before significant loss of viability occurs—is approximately 14 days. The high transportation costs and limited shelf life tend to limit the scope of practical geographical distribution of the product. In particular, it is not commercially feasible to export the product.

In addition to being used to improve soil aggregation, algae have been used to fix nitrogen. In particular, certain blue-green algae have been used in flooded rice fields for this purpose. It is well established that the rice field ecosystem is a favorable environment for the growth of blue-green algae and that nitrogen fixation by blue-green algae plays a vital role in the buildup and maintenance of soil fertility in such fields. Release of nutrients through microbial decomposition after the death of the algae appears to be the principle means by which nitrogen is made available to the rice. Roger, P. A. and Kulasooriya, S. A., *Blue-Green Algae and Rice* (Manila: The International Rice Research Institute, 1980), pgs. 49–50, hereinafter Roger and Kulasooriya. The entire focus of Roger and Kulasooriya is on the use of blue-green algae for nitrogen fixation in flooded rice fields. In fact, they report that the use of the algae seems to have little effect on the physical properties of the soil, although it may improve soil aggregation. Ibid., p. 77.

Roger and Kulasooriya disclose two methods for the production of a dry form of blue-green algae for application to flooded rice fields. One method comprises growing the blue-green algae in liquid culture, mixing the algae with an inert material for support, and drying the mixture. From the information provided, the supports appear to be incapable of dispersion in water or uniform application to soil. One such support is sand. Ibid. pgs. 81–85. The other method comprises growing blue-green algae in trays of liquid culture, allowing the water in the culture to evaporate in the sun to produce dry flakes or a dry mass, and collecting the flakes or scraping the mass off the bottom of the trays. Ibid., pg. 82.

There are a number of disadvantages to the methods disclosed by Roger and Kulasooriya. First, they have been shown to be applicable only to fields submerged under water; i.e., rice fields. Uniform application of the algae to the field is attained by introducing the algae non-uniformly into the rice field followed by vegetative propagation of the algae and uniform dispersion over the field by virtue of the motility of the algae in the water covering the field. Virtually any cash crop of interest other than rice is grown on a dry field.

Second, the material produced is not capable of an economical, uniform dispersion on a large area of soil using modern agricultural equipment, as is the case with most commercial farming in developed countries. For dried algae produced by the first method, the inert materials supporting the algae, such as sand, are not adapted to easy, uniform application to a field. Rather, the technique appears to be designed to use labor intensive methods, in particular, dispersal by hand. In fact, the authors state that a disadvantage of using sand is that the heavy particles sink into the mud and therefore hamper the rapid growth of the adhering algae. Ibid., p. 82. Dried algae produced by the second technique would also not be capable of economical, uniform dispersion on a large, dry soil surface using modern agricultural equipment. Because of the filamentous nature of most blue-green algae, the dried mass cannot readily be reduced to small particles or suspended in water.

Applicants have surprisingly discovered compositions of flocculant-producing photosynthetic microorganisms and methods for preparing and using the compositions to produce microbial cover crops which overcome the disadvantages of the above-mentioned compositions and methods. Applicants have invented compositions containing drought-resistant, dormant, flocculant-producing photosynthetic microorganisms that can be easily and cheaply transported virtually any distance and are capable of easy, uniform application to a dry field, such as by forming a suspension in water and spraying the suspension on the field. As a result, the cost of transporting such compositions is expected to be cut at least in half and possibly by as much as a factor of 10, and the shelf life of such compositions is expected to increase from two weeks to at least six months and perhaps as much as 18 months. Applicants have also invented methods of preparing such compositions and of using them to provide a cover crop and to improve soil aggregation. Finally, applicants have discovered, contrary to the teachings of the art, that it is not necessary for certain algae in the vegetative stage to be deprived of nitrogen before being able to produce significant quantities of flocculants.

SUMMARY OF THE INVENTION

It is an object of the present invention to provide a microbial composition for application to soil to provide a cover crop and to improve soil aggregation.

It is another object of the present invention to provide a method for the production of a microbial composition for application to soil to provide a cover crop and to improve soil aggregation.

It is still a further object of the present invention to provide a method for treating soil to provide a microbial cover crop and to improve soil aggregation.

Additional objects and advantages of the invention will be set forth in part in the description that follows and in part will be obvious from the description or may be learned from practice of the invention. The objects and advantages may be realized and attained by means of the instrumentalities and combinations particularly pointed out in the appended claims.

To achieve the objects and in accordance with the purpose of the invention, disclosed herein is a composition for treating soil comprising a dry, flowable mixture of flocculant-producing photosynthetic microorganisms in a resting stage and a dry, particulate, water dispersible carrier, which composition is capable of uniform application to dry soil to provide a cover crop of the microorganisms in a vegetative stage and to improve soil aggregation through the action of the flocculant. In a preferred embodiment, the photosynthetic microorganisms are algae. In a particularly preferred embodiment, the algae is a mixture of at least two different, substantially pure strains of algae selected from any one or more of the species *Chlamydomonas nivalis, Chlorella pyrenoidosa, Nostoc commune, Oscillatoria prolifica,* or *Aphanothece nidulans.*

In accordance with the present invention, there is also provided a method for the production of the dry, flowable composition by growing flocculant-producing photosynthetic microorganisms in a nutrient-containing medium and inducing a resting stage in the microorganisms by mixing them with a dry, particulate, water dispersible carrier to produce a dry, flowable composition, which is capable of uniform application to dry soil to provide a cover crop and to improve soil aggregation through the action of the flocculant. In a preferred embodiment, the microorganisms are substantially separated from the medium before inducing a resting stage. In a particularly preferred embodiment, the flocculant-producing photosynthetic microorganisms are algae.

In another particularly preferred embodiment, the composition is produced by growing separately at least two different, substantially pure cultures of algae in nutrient-containing media, substantially separating the algae from the media, mixing the substantially separated algae, and inducing a resting stage in the mixed algae by mixing them with a dry, particulate, water dispersible carrier to produce a dry, flowable composition, which is capable of uniform application to dry soil to provide a cover crop and to improve soil aggregation. In another particularly preferred embodiment, the resting stage in the algae is induced by spraying the separated algae onto a dispersion of dry, particulate, water dispersible carrier while mixing the algae with the carrier.

In an alternative embodiment, the composition is produced by growing algae in a nutrient-containing medium, inducing a resting stage in the algae by manipulating the nutrients in the medium to cause the algae to form zygospores, substantially separating the zygospores from the medium, and mixing the substantially separated zygospores with a dry, particulate, water dispersible carrier to produce a dry, flowable composition, which is capable of uniform application to dry soil to provide a cover crop and to improve soil aggregation.

In still another alternative embodiment, the composition is produced by growing flocculant-producing photosynthetic microorganisms in a nutrient-containing medium, substantially separating the microorganisms from the medium, inducing a resting stage in the substantially separated microorganisms by drying them to produce a mass, and reducing the mass to particles to produce a dry, flowable composition, which is capable of uniform application to dry soil to provide a cover crop and to improve soil aggregation.

This invention also provides a method for providing a cover crop and improving soil aggregation by the application to dry soil of a composition comprising a dry, flowable mixture of flocculant-producing photosynthetic microorganisms in a resting stage and a dry, particulate, water dispersible carrier, which composition is capable of uniform application to the dry soil to provide a cover crop of the microorganisms in a vegetative stage and to improve soil aggregation through the action of the flocculant. In a preferred embodiment, the flocculant-producing photosynthetic microorganisms are a mixture of at least two different, substantially pure strains of algae. In another preferred embodiment, the composition is applied to soil that has a moisture content of approximately 50–100% of the soil's field capacity. In a particularly preferred embodiment, the composition is mixed with water substantially free of chlorine to form a suspension and the suspension is sprayed onto the soil.

This invention also provides a method for providing a cover crop and improving soil aggregation comprising the application of flocculant-producing algae in a vegetative stage to dry soil, wherein the algae are capable of producing flocculants in sufficient quantities to aggregate soil particles without being deprived of nitrogen. In certain cases, sufficient moisture may need to be maintained in the soil so that the algae continue to multiply. Preferably, the algae in the vegetative state are substantially pure strains selected from any one or more the species *Nostoc commune, Chlamydomonas mexicana,* or *Chlamydomonas sajao.*

DETAILED DESCRIPTION OF THE INVENTION

Reference will now be made in detail to the presently preferred embodiments of the invention, which, together with the following examples, serve to explain the principles of the invention.

The present invention relates to microbial compositions for application to soil to provide a cover crop and to improve soil aggregation. The compositions comprise a dry, flowable mixture of flocculant-producing photosynthetic microorganisms in a resting stage and a dry, particulate, water dispersible carrier. The compositions are capable of uniform application to dry soil to provide a cover crop of the microorganisms in a vegetative stage and to improve soil aggregation through the action of the flocculant. The compositions may also include other materials in dry, particulate form, such as various plant nutrients, especially fertilizers. In some instances, it may also be desired to provide nutrients for the photosynthetic microorganisms in the composition, for example, when the composition is being applied to nutrient-poor soil.

The photosynthetic microorganisms of the present invention are any flocculant-producing microorganisms that utilize chlorophyll to convert carbon dioxide, nutrients, and inorganic nitrogen into cell substance by means of energy derived from sunlight. The prime examples of such microorganisms are algae, particularly green and blue-green algae, which are the preferred microorganisms for compositions of the present invention. However, the teachings of the present invention may be adapted by those of ordinary skill in the art to the preparation and use of compositions containing other flocculant-producing photosynthetic microorganisms, where the photosynthetic or flocculant-producing capabilities are introduced by any of the various techniques of genetic manipulation.

In a preferred embodiment, the compositions contain one or more strains of green or blue-green algae. Generally, it is preferable to use a mixture of strains so that the composition may be used on a wide variety of soil types. In particular, green algae have been found to survive and grow better than blue-green algae on soils with a pH of approximately 4 to approximately 7. On the other hand, blue-green algae generally survive and grow better than green algae on soils having a pH of approximately 7 to approximately 9. Thus, it is preferred that the composition contain at least one strain of blue-green algae and at least one strain of green algae. As used herein, the term "strain" shall mean a distinct subtype of a species.

For reasons of quality control and economics, the algae are generally grown in substantially pure cultures. That is, a particular species or strain of a species is grown in a nutrient-containing medium which is substantially free of algae of different species and may even be substantially free of other strains of the same species. Algae from such substantially pure cultures are then mixed into the soil treatment compositions. In a preferred embodiment, the compositions contain mixtures of at least two different, substantially pure strains from any one or more of the genera Chlamydomonas, Chlorella, Nostoc, Oscillatoria, Aphanocapsa, Aphanothece, Schizothrix, or Microcoleus. One particularly preferred embodiment comprises a mixture of at least two different, substantially pure strains selected from any one or more of the species *Chlamydomonas nivalis, Chlorella pyrenoidosa, Oscillatoria prolifica* (sometimes called *Oscillatoria prolifera*), or *Aphanothece nidulans.* Another particularly preferred embodiment also contains a substantially pure strain of *Nostoc commune* as well as at least one strain selected from any one or more of the species mentioned in the preceding sentence.

In one particularly preferred embodiment, the green and blue-green algae are selected for their ability to produce relatively high amounts of flocculants when compared to other strains of green or blue-green algae. It is difficult to define precisely the criteria for determining high flocculant production because of variability in the way the flocculants are produced and in the physical properties of the flocculants themselves. The algal cells produce and excrete the flocculants to form a mucus-like sheath around the cells. Some types of algae produce such a sheath within a few hours, while others require several days. Sometimes the sheath can be fairly easily separated from the cells, and the volume or weight of the separated flocculants can be measured. Other times, it is difficult to separate the sheath, and visual examination must be relied upon.

Applicants have used the following assay to select for high flocculant-producing algae. Different species or strains of algae are grown under conditions favoring the maximum production of flocculants for that species or strain. Approximately one-half ml of the algae in suspension is added to a four-inch wide petri dish filled with approximately ten ml of water. At the bottom of the petri dish is approximately one-half gram of very finely ground, reagent grade, pure kaolin clay. After the algal suspension is added to the petri dish, the dish is swirled several times by hand at a rate of approximately 40–50 revolutions per minute, and the clay is visually examined for aggregation. When it occurs, such aggregation happens within approximately 15 seconds. Algae that cause such aggregations are considered to be high flocculant producers, while those that do not cause the aggregation are considered to be low flocculant producers. The high flocculant producers have been shown to produce sufficient quantities of flocculants to aggregate soil particles after growing on the soil for a sufficient time, generally two to six weeks.

The algae in the compositions of the present invention are in a resting stage. In contrast with algae in the vegetative stage, where they are growing and multiplying, algae in a resting stage are essentially dormant. The cells may be partially or completely dried or may be in the form of spores, where the cell wall is very heavy and resistant to the environment. In this stage, the algae can survive dessication and other environmental extremes. Much is still unknown about the physiological mechanisms by which algae may enter a dormant or resting stage when dried and then be revived by the addition of water to re-enter the vegetative stage. Different species of algae appear to take different forms in this stage, while many others are unable to enter a resting stage so as to survive dessication. Thus, as used herein, the term "resting stage" shall mean any form or physiological state entered into by algae or other photosynthetic microorganisms when dried that allows them to survive drying and to re-enter the vegetative stage when rewetted. Algae that are able to enter a resting stage usually have a fairly high survival rate, i.e., 90 to 95% of the cells are able to re-enter the vegetative stage. Those that are unable to enter the resting stage have an extremely low survival rate. Few, if any, survive dessication.

As previously mentioned, of those species of algae that are capable of entering a resting stage, different species have different forms in that stage. In one embodiment of the invention, the cells appear to go directly from a vegetative stage to the resting stage by simply drying out. In another embodiment of the invention, other species of algae are able to enter a resting stage only after the nutrients in the culture medium are manipulated so as to cause the algae to begin reproducing sexually, forming zygotes. The zygotes then develop into heavily walled, environmentally resistant, dormant cells called zygospores, which are capable of surviving dessication.

In the compositions of the present invention, the flocculant-producing photosynthetic microorganisms have been mixed with a dry, particulate, water dispersible carrier. The compositions are dry, flowable, and capable of uniform application to dry soil. As used herein, the term "capable of uniform application" means capable of even dispersion on the surface of soil over the entire area over which the cover crop is to be grown. As used herein, the term "water dispersible" means capable of dissolving in or forming a suspension in water.

Any carrier that is dry, particulate, and water dispersible may be used. The carrier need not be inert, but it should not be toxic or otherwise harmful to the microorganisms. Examples of such carriers include whey, guar gum, gum arabic, agar, malto dextrin, lactose, and fine grain clay. Lactose or fine grain clay are particularly preferred. When clay is the carrier, any dry clay whose particles are water dispersible may be used. Particularly preferred are clay particles with a diameter from about 0.1 microns to about 5 microns. One such type of clay is Attapulgite clay, 99.7% of which will pass through a number 325 mesh screen.

The compositions of the invention are capable of application to dry soil. As used herein, the term "dry soil" means soil that is not flooded or otherwise under water. More specifically, the term means soil with a moisture content of from 100% to 0% of field capacity. Field capacity is the percentage of water remaining in a soil 2 or 3 days after having been saturated and after free drainage has practically ceased.

The algae of the inventive compositions generally grow best when the soil has a moisture content of at least 55% of field capacity. However, the algae will generally grow on soil with a moisture content as low as approximately 40% of field capacity. Below approximately 40% of field capacity, the algae will stay in or re-enter the resting stage until the soil gains additional moisture. Thus, one of the advantages of the inventive compositions is that they can be applied to very dry (less than 40% of field capacity) fields without adding additional water. Instead, the farmer can rely on natural rainfall. In addition, if the algae have been growing and producing flocculants, and if the moisture content of the soil then drops below 40% of field capacity, the algae can enter the resting stage until the amount of moisture increases.

The compositions of the present invention are produced by the following method:

(a) growing flocculant-producing photosynthetic microorganisms in a nutrient-containing medium; and (b) inducing a resting stage in the microorganisms by mixing them with a dry, particulate, water dispersible carrier. In the resulting composition, the majority of the microorganisms are adhered to the particles of the carrier or inside a collection of such particles. In a preferred embodiment, the microorganisms are substantially separated from the medium before being mixed with the carrier to induce the resting stage.

After the microorganisms have been mixed with the carrier, the composition is substantially dry. If desired, it may be further dried by techniques known in the art at moderate temperatures that preserve viability of the cells. For example, the composition may be placed into flat trays and further dried by passing dry air over it. The temperature of the air should be no higher than approximately 65° C. and preferably in the range of approximately 25° C. to 35° C. Within this range, the drying time will be approximately one-half to two hours. Alternatively, heat lamps or a drying drum can be used to complete the drying.

The inventive method generally produces compositions that are in particulate form, capable of dispersion in water for uniform application to a dry field. However, in some instances, it may be necessary or desirable to reduce the particles further in size. This may be accomplished by crumbling, grinding, pulverizing, or any method known in the art for reducing the size of particles, so long as such method preserves the ability of the resting stage microorganisms to re-enter the vegetative stage when subjected to sufficient moisture.

The organisms used in the invention process are those previously mentioned with respect to the compositions.

As previously mentioned, it is generally preferred that the compositions contain a mixture of different strains of algae. The preferred process for producing this mixture is to grow separately at least two, substantially pure cultures of algae in nutrient-containing media, substantially separate the algae from the media, mix the substantially separated algae, and induce a resting stage in the mixed algae by mixing them with a dry, particulate, water-dispersible carrier to produce the desired compositions. In an alternative embodiment, a resting stage is induced in each of the different, substantially separated algae by mixing each with a dry, particulate water-dispersible carrier to produce intermediate compositions, and the intermediate compositions are mixed to produce the desired composition.

The flocculant-producing photosynthetic microorganisms are grown by techniques known in the art. Methods for growing green and blue-green algae, for example, are disclosed in U.S. Pat. No. 3,958,364 to Schenck et al., issued May 25, 1976, which is incorporated herein by reference, and in U.S. Pat. No. 3,889,418 to Porter et al., issued June 17, 1975, which is also incorporated herein by reference. In general, the algae are grown in 1,00–1,500 gallon production tanks under conditions of sufficient light, nutrients, oxygen, and carbon dioxide to allow the algae to multiply. When originally added to the tanks, the water is sterile, filtered, and dechlorinated. It is continuously mixed in the tanks. The carbon dioxide is bubbled through the water to permit the algae to be grown and maintained at a higher density than otherwise possible. Artificial light is provided under a cycle of 18 hours of light and 6 hours of darkness, although other light regimes, including continuous light, may be used.

All algal species are maintained on agar slants with nutrient enrichment of the agar by nitrogen, potassium, phosphorous, and trace nutrients. It is generally necessary to scale up through a series of intermediate cultures to reach a culture with a volume of approximately 1,000 gallons.

The algae in the production tanks are grown to a maximum density of approximately $10^7$ cells per ml. Once the maximum density is reached, some cells must be harvested daily to maintain a stable healthy culture. For green algae, 40% to 60% of the volume is harvested daily and replaced with sterile, filtered, dechlorinated water to return the volume to the original level. For blue-green algae, approximately 10% to 30% of the volume is harvested daily.

After the algae is harvested, it can be directly mixed with the carrier and dried. However, it is preferable to substantially separate the algae from the medium first. This can be done by any number of techniques, including centrifugation, settling, using a collecting screen, and skimming the cells from the surface of the medium. Centrifugation is preferred for green algae. Approximately 95% of the volume of the water can be removed in this way, resulting in a paste of algae. The paste can be removed from the centrifuge by a pressurized stream of sterile, filtered, dechlorinated water that results in a slurry of green algae. This slurry is then mixed with the carrier.

Blue-green algae also can be centrifuged, but the filamentous species can clog the machine. Thus, the preferred method of separation from the medium is to cease mixing the cells, whereupon they settle into a mass at the bottom of the container. The mass can be removed through a drain spigot in the bottom of the container.

Blue-green algae can also be separated from the medium by pouring the slurry through a collecting tray with a screen bottom. However, the screen must be backwashed frequently with sterile water to prevent clogging.

Still another technique can be used for motile, phototactic cells, which are attracted to light. These are primarily green algae. When the mixing of the culture is stopped and the lights are left on, a thick, concentrated layer of cells will appear eventually on the surface. The layer may then be skimmed off.

In a preferred embodiment, the resting stage is induced in the separated cells by mixing the cells with the carrier. In a particularly preferred embodiment the algae are sprayed onto a dispersion of the carrier while being mixed with the carrier. The algae may be mixture of two or more strains and such strains may be mixed prior to or at the time of being spray-mixed with the carrier. The algae and carrier are spray-mixed at any ratio of volumes that will result in a substantially dry mixture. Generally, the ratio is approximately 1–5% by volume of algae in a slurry to approximately 99–95% by volume of carrier. As previously mentioned, the resulting mixture can be further dried by any technique that will preserve the ultimate viability of the cells that are in the resting stage.

In an alternative embodiment, the algae are induced to enter a resting stage by manipulating the nutrients in the medium. This is accomplished by decreasing the level of nitrogen, which causes certain green algae to undergo sexual reproduction. For example, the $NaNO_3$ may be removed from the standard Bristol's medium. Some species, which are known as heterothallic, form two different mating types, known as the mating type plus and the mating type minus. The different types mate to form zygotes. Other species, which are known as homothallic, form only one mating type, which also mate to form zygotes. For either type, the zygotes undergo a complex series of changes, which results in the formation of heavily-walled, environment-resistent, dormant cells called zygospores. The zygospores are removed from the medium, preferably by centrifugation or filtration as described above. They are then mixed with the carrier as described above. One particularly preferred species of algae for use in this embodiment is *Chlamydomonas mexicana.*

It is preferred that this technique be applied to separate cultures of different strains of zygospore-forming algae to form such zygospores. The zygospores are then substantially separated from the media, mixed together, and then mixed with the carrier. Alternatively, the separated zygospores of the different strains can each be mixed with carriers to form intermediate compositions, which are then mixed to form the compositions of the invention. In still another alternative, the separated zygospores can be mixed with nonzygospore-forming algae, which have been substantially separated from the media in which they were grown. The mixture is then mixed with the carrier to produce the compositions.

If the algae is a heterothallic species, the plus and minus mating types can be grown in separate vats. During the growth stage it is important that the cultures be kept actively growing so that they do not form gametic cells. This is accomplished by keeping the nitrogen level high enough to maintain the vegetative stage. When the algae has reached the desired density, the plus and minus mating types can be mixed together and the nitrogen level decreased so that mating or sexual reproduction is encouraged. This can be checked by microscopic inspection of samples drawn from the vat. When a suitable percentage of the cells have formed zygospores the zygospores are removed from the growth medium.

The same process is used to induce homothallic algae to form zygospores. However, the algae are grown in a single vat.

In still another embodiment, certain species of algae or other flocculant-producing photosynthetic microorganisms may be induced to enter a resting stage by direct drying without simultaneously mixing with the carrier. Specifically, after the algae are grown in and separated from the medium as described above, they are dried under moderate temperatures. For example, they may be dried by heat lamps or dry air. This produces a dry mass, which is usually hard and brittle. The mass can be crumbled into particles. The particles need not be mixed with the carrier, but can be applied to soil by simply suspending them in water and adding the suspension to the soil. This embodiment works best with green algae and nonfilamentous blue-green algae because a filamentous mass cannot be easily crumbled into particles. The preferred species for this embodiment are *Chlamydomonas nivalis, Chlorella pyrenoidosa,* and *Aphanothece nidulans.*

The compositions of the invention are used to provide a cover crop and to improve soil aggregation. This is accomplished by applying the compositions uniformly to dry soil. If there is sufficient moisture in the soil, the resting stage flocculant-producing photosynthetic microorganisms in the compositions will enter the vegetative stage, multiply, and produce flocculants. If there is insufficient moisture in the soil, it can be added. Nutrients may also be added, although this is generally not necessary for most soils.

When the microorganisms are algae, sufficient moisture is approximately 40% of field capacity or more. However, for the algae to grow profusely, the moisture content of the soil surface should be at least approximately 50% of the soil's field capacity. If desired, soil moisture and nutrients may be maintained in the soil so that the algae continue to grow profusely, although this is generally not necessary. Moreover, as previously mentioned, it is not necessary to add or maintain a certain level of nitrogen initially and then allow the nitrogen to be depleted for the algae to produce sufficient quantities of flocculants to aggregate soil particles.

The compositions may be applied by any technique that permits their wide dispersal and uniform application to the soil. It is preferred that the compositions be mixed with water at or near the site of application to form a suspension, which may then be sprayed onto the field, such as through an existing irrigation system. The water should be substantially free of chlorine, which can kill the cells. The concentration of cells should be at least one hundred cells per square centimeter of soil surface. Preferably, from approximately 250 to approximately 1,000 cells per square centimeter of soil surface are added.

In an alternative embodiment, the invention provides a method for providing a cover crop and improving soil aggregation comprising applying flocculant-producing algae in a vegetative stage to dry soil, wherein the algae are capable of producing flocculants without being deprived of nitrogen as taught by Foge et al. Thus, cellular nitrogen does not have to be maintained at about 10% by weight and then be allowed to fall to about 5% by weight. In this embodiment, the vegetative stage algae may be a single strain or a mixture of strains. Preferred strains are selected from the genera Nostoc or Chlamydomonas. The species *Nostoc communie, Chlamydomonas mexicana,* or *Chlamydomonas sajao* are particularly preferred, and the particularly preferred strain or strains may be selected from any one or more of these species. The concentration of cells should be at least 100 cells per square centimeter of soil surface and preferably from about 250 to about 1,000 cells per square centimeter of soil surface. If necessary, soil moisture and/or nutrients other than nitrogen can be added or maintained so that the algae continue to multiply. Soil moisture is maintained at least at 40% of field capacity and preferably from approximately 50-100% of field capacity.

It is to be understood that the application of the teachings of the present invention to a specific problem or environment will be within the capabilities of one having ordinary skill in the art in light of the teachings contained herein. Examples of the compositions of the present invention, processes for their production, and processes for their use appear in the following examples.

EXAMPLE 1

Preparation of Composition Containing

*Chlorella pyrenoidosa* in a Resting Stage

A 20 liter innoculum of *Chlorella pyrenoidosa* containing approximately 5 million cells per ml. and one liter of concentrated algae nutrient medium were added to a production tank containing 1,000 gallons of sterile, filtered, dechlorinated water. The water in the tank was continuously mixed and carbon dioxide was added to the water. The culture was illuminated under a cycle of 18 hours of light and six hours of dark by 5 1000-watt mercury-halogen lights mounted above the tank. After approximately six days, the cells were at a maximum density. Fifty percent of the volume was harvested and replaced with sterile, filtered, dechlorinated water to return the volume to approximately 1,000 gallons.

The harvested cells were centrifuged by a diary clarifier that can handle 900 gallons per hour of flow through material. The centrifugation removed approximately 95 percent by volume of the water, leaving a paste of algae in the centrifuge bowl. The machine was stopped, disassembled, and rinsed by sterile, filtered, dechlorinated water under pressure into a receiving bucket, producing a 15 liter slurry of algae at a density above 200 million cells per ml.

The slurry was sprayed onto Attapulgite clay in a paddle mixer containing 50 lbs. of the clay. The mixer contained four paddle blades that mix the material at a rate of 48 rpm. About one percent of slurry by volume was added to about 99 percent of clay by volume. This produced a well-mixed, dry product. Additional drying was accomplished by placing the mixture into a flat, 3 ft. by 2 ft. by 3 in. tray and passing dry air at 80° F. over it for 2 hours. After removal of samples for testing, the composition was placed in plastic containers, sealed, and stored at room temperature.

The samples were re-wetted and sprayed on agar plates to assay for viability of the algae. The algae resumed vegetative growth within 7 days.

EXAMPLE 2

Preparation of Composition Containing

*Chlamydomonas mexicana* Zygospores

The opposite mating types of this strain of algae were grown on standard agar solidified medium at about 20° C. under continuous light. After the cells had reached a healthy population density, the two mating types were removed from the agar culture and suspended separately in Bristol's medium and allowed to grow until they reached cell densities of approximately $10^6$ cells/ml, so that approximately equal numbers of the opposite mating type were obtained.

The two mating type cultures were then mixed together and allowed to continue to grow in the Bristol medium. The culture was allowed to sit under continuous light at approximately 20° C. As the cells continued to divide vegetatively, the culture developed a darker green color. No additional nutrients were added to the culture to replenish the exhausted nutrients. The beginning of nutrient starvation was indicated by the yellowish color taken on by the culture. After a period of several days, the culture began to develop a brownish color which was shown microscopically to correlate with the formation of zygospores. Periodic microscopic examination of samples revealed that the percentage of zygospores reached a maximum after 21 days. Zygospore yields of approximately 10 percent were observed.

At this point, the culture was centrifuged and the supernatant poured off. The slurry remaining was a dark brown color. This slurry, composed of nearly 100 percent zygospores, was then removed from the centrifuge, spread on glass plates, maintained in calcium chloride, and left under dark conditions. The material was allowed to sit for about a week during which time the water evaporated. The zygospore material was then mechanically scraped from the glass plate. At this point, it had the consistency of sawdust.

The material was tested for germination by placing samples of the powder in a standard culture medium. Germination percentages of up to 75% were observed. There was no observable decrease in germination percentage when the cells were held for as long as approximately eight weeks.

EXAMPLE 3

Application of Resting Stage Algae to Soil

Description of Experimental Site and Methods

The effects of drought on the test strains of algae were assayed under shaded canopies, with controlled amounts of moisture, on bare soil in a field in Jefferson County, Iowa. The soil would be classified as a Haig and Grundy, silty clay loam.

Design of Canopies

Canopies of 4 ml. white plastic were erected over the test plots. Three separate structures 60' by 10' were built to cover the experimental plots, and the canopies were suspended 4½' to 5' above the ground to keep any rain off of the plots. Each experimental plot was four feet by two feet and separated by metal flashing.

The sides of the structures were open, allowing air flow and plenty of light to propagate the algae. Direct rainfall was kept off of the plots by the existence of the canopies, and a slight shading effect from direct solar radiation was accomplished which mimicked the shading a mature cash crop would have on the soil surface during summer months.

A plumbing system of PVC pipes with misting nozzles was mounted under the canopy above the plots for controlled moisture application. The plots were watered once daily between 11:0 a.m. and 12:00 noon and moisture levels in the surface one inch of the soil were documented daily by daily reading of a total of twelve gypsum soil moisture blocks before watering with a Delmhorst Instrument Company moisture meter for A&L Labs. With daily watering, the surface maintained a very wet condition in the range of 10 on the meter.

Air temperature was recorded daily on six thermometers under the canopy at two feet above the soil surface, and the soil temperature in the top two inches was also monitored daily at six locations on the plots.

Five strains of resting stage algae were tested. They were *Nostoc muscorum, Aphanothece nidulans, Nostoc commune, Chlorella pyrenoidosa,* and *Chlamydomonas peterfii,* referred to as BG-1, BG-2, BG-3, C-1, and C-2, respectively. C-2 had been prepared according to the method of Example 1, with the carrier being dried agar. The other strains had been dried without being mixed with a carrier. Sever replicates for each strain were tested, resulting in 35 test plots. There were 8 control plots.

The dried stains were added to dechlorinated water and diluted to provide a suspension of approximately $10^7$ cells/ml. The suspension was sprayed onto the test plots at a concentration approximately one quart of suspension per 20 gallons of water per acre, which provided a concentration of approximately $10^{10}$ cells per acre. These plots were not watered for seven days after application of the strains. Then all test plots were watered daily for 28 days. The control plots were watered in the same manner as the test plots, but no algae were applied to them.

Soil samples and algae samples were collected at day 14 and 28 and analyzed for wet aggregate stability and modulus of rupture as soil physical assays; microscopically analyzed for viability and algal identification, and two weeks after the watering ended, a proving ring penetronomoeter was used to test soil compaction. All test plots and control plots were samples.

Methods

Sample Preparation

Bulk samples were assembled from trowel scoops taken randomly over each plot. In the laboratory, they were spread and air dried for 72 hours and then gently crushed with a rubber mallet. The soil was screened by hand in 8-inch brass wire sieves into two fractions: (1) all material passing a 2.00 mm sieve and (2) material passing the 2.00 mm sieve but retained on a 1.00 mm sieve. The samples were stored in closed polyethylene buckets.

Wet Aggregate Stability

The method used closely followed Kemper, W.D., "Aggregate Stability," *Methods of Soil Analysis Part I: Physical and Mineralogical Properties, Including Statistics of Measurement and Sampling,* C. A. Block (ed.), pgs. 511–519 (1965), which is incorporated herein by reference. Approximately 50 g. of aggregates retained on the 1.00 mm screen were wet sieved for 7 minutes at 30 cycles/min. with a shaker table rise of 125 mm per cycle. The screen was a No. 60 (0.25 mm) Soiltest 8-inch diameter sieve. A No. 18 (1.00 mm) was placed above it and a No. 10 (2.00 mm) was placed below it to keep small aggregates from escaping over the sides, but otherwise the flow of water was unrestricted. The aggregates were immersed rapidly, screened, washed into a drying dish and dried at 100° C. overnight. The weight of sand was determined by hand washing the dried sample on the No. 60 screen in a dispersing solution 5 g/l sodium metaphosphate. Sand retained on the screen was washed into the drying dish, dried and weighed for substraction from both water stable aggregates and initial aggregates, the ratio of which was termed "percent water stable aggregates".

Modulus of Rupture

The method used was that described by Reeves, "Modulus of Rupture," *Methods of Soil Analysis Part I: Physical and Mineralogical Properties, Including Statistics of Measurement and Sampling,* C. A. Black (ed.), pgs. 466–471 (1965), which is incorporated herein by reference. A briquet loading device was custom made from hardwoods with loading by trickling water. The briquet molds were purchased from Soilmoisture Corp., Santa Barbara, CA. Material passing the 2.00 mm. sieve and reasonably free of vegetable trash was placed through a plastic funnel into the molds, which rested on filter paper on top of aluminum screen frames. Because most of the soils were fairly well aggregated, it was found necessary to add compaction to the standard method of this stage to produce briquets that could be handled and tested without crumbling. A pin wood block was placed on the screened off soil surface and an 11.4 lb. weight gently applied for a few seconds. The pressure was 3.3 psi. More soil was sprinkled on the compressed surface, screened off, and the same compaction repeated. Eight briquets were manufactured per screen rack, which was wetted from below to saturation and soaked for one hour before drying at 50° C. for 36 hours. The briquets were broken as simple beams in the standard way, their dimensions measured, and the modulus of rupture calculated from the formula for fiber stress in beams, $s = 3 FL/2\ bd^2$ dynes/cm$^2$, where F equals the breaking force applied at the center of the briquet beam span, L equals the distance between the briquet end supports, b equals the width of the briquet, and d equals the depth or thickness of the briquet measured parallel to the direction of the applied load.

Macroscopic and Microscopic Analysis

At two weeks, a green growth was visible to the naked eye on most of the test plots and on the controls. The color of green varied from controls, the green algae, and the blue green algae. Visual examination of controls revealed mosses and probable algal growth; the green algae plots C-1 and C-2 had a more distinctive algal growth, and the blue-green plots, BG-1, BG-2, and BG-3 had a bluer green color.

Microscopic analysis revealed the presence of plant residue, numerous bacteria, other ubiquitous algae, soil animals, and the properly transplanted algae on all plots. Colonies of 500–5,000 transplanted algae cells for the tested organisms were observed Field Penetration The field plots were tested using a Soiltest Proving Ring Penetrometer. This device was a 5-inch diameter steel proving ring with 0.0001-inch guage to measure the force required to push a 2.0-inch long conical steel point into the soil. The point's angle was 30 degrees, and its diameter at the top was one inch. Five probings were made in both control and treated plots, including both high and low areas of the micro-terrain. The moisture content was less than field capacity.

Results

At two weeks of watering, after a week of drought, two of the five strains had a marked result on wet aggregate stability, above 70% significance, with BG-1 at 70% and BG-2 at 99%. At four weeks, the control plots had risen in aggregate stability so that none of the test plots were significantly different than the control. See Table 1.

At two weeks of watering after seven days of drought, BG-2 showed a softer modulus of rupture than the control at the 90% confidence level. All other strains showed no significant difference than the control at two weeks. At four weeks, BG-3 had stronger modulus of rupture than the control at a 90% confidence level, with BG-1 stronger at a 95% confidence level. BG-2 showed a 95% confidence level of difference with the control at a softer modulus of rupture. See Table 2.

Under the drought conditions, no green algae appeared, but at day ten, three plots were green, BG-3 and two controls. By day eleven 30 of 58 plots were green, with BG-1, BG-2 and BG-3 having five of seven plots green and the control, C-1, and C-2 at four or less green plots. By day twelve, 55 of 58 plots showed signs of green growth.

Microscopic analysis of all plots at 28 days of watering showed an active bacterial population, multivaried algal population, and active soil animals. Evidence of colonies of 500–5,000 of the test strains were found on each plot in clumps scattered among the diverse flora. Controls were dominated more by moss and plant debris than the experimental plots.

Field penetration data showed significant difference on four drought treatments but with the control softer than any treatment. See Table 3.

Discussion

We saw effects greater than the control for BG-1 and BG-2 at two weeks in wet aggregate stability and with BG-2 for modulus of rupture at two weeks. At four weeks of watering, aggregate stability on the controls was not significantly different from any of the strains, field penetration data was confused even though modulus of rupture was significantly stronger than control at 90% or greater for BG-1, BG2, and BG-3 and 75% for C-1.

Conclusion

When the test strains were subjected to drought conditions for seven days after inoculation, there was growth on all plots after two weeks of watering, with BG-1 and BG-2 showing statistically detectable differences compared to the control on aggregate stability. Under modulus of rupture, BG-2 showed a 90% significance level compared to control. At four weeks, aggregate stability was not significantly different than control for all strains, but modulus of rupture showed statistically significant differences for BG-1, BG-2, and BG-3, greater than 90% compared to the control and at a 75% confidence level for C-1.

TABLE 1

| | WET AGGREGATE STABILITY | | | | | |
|---|---|---|---|---|---|---|
| | 2 Weeks | | | 4 Weeks | | |
| STRAIN | % Agg.* | Stan. Dev. | C.L. | % Agg.* | Stan. Dev. | C.L. |
| CONTROL | 27.0 | 2.1 | — | 29.7 | 8.1 | — |
| C-1 | 27.0 | 3.4 | N.S. | 29.7 | 4.6 | N.S. |
| BG-1 | 29.8 | 4.7 | 70% | 29.0 | 4.3 | N.S. |
| BG-2 | 32.4 | 3.9 | 99% | 32.8 | 4.1 | N.S. |
| C-2 | 29.1 | 3.9 | N.S. | 29.0 | 3.7 | N.S. |
| BG-3 | 30.1 | 6.2 | N.S. | 27.4 | 6.2 | N.S. |

*Based on 35 test plots and 40 control plots
C.L. = Confidence Level
N.S. = Not Significant

TABLE 2

| | MODULUS OF RUPTURE | | | | | |
|---|---|---|---|---|---|---|
| | 2 Weeks | | | 4 Weeks | | |
| STRAIN | Avg.* | Stan. Dev. | C.L. | Avg.* | Stan. Dev. | C.L. |
| CONTROL | 203 | 59 | — | 210 | 54 | — |
| C-1 | 170 | 27 | N.S. | 241 | 64 | 75% |
| BG-1 | 172 | 45 | N.S. | 316 | 73 | 95% |
| BG-2 | 107 | 82 | 90% | 159 | 39 | 95% |
| C-2 | 194 | 85 | N.S. | 212 | 67 | N.S. |
| BG-3 | 191 | 80 | N.S. | 265 | 49 | 90% |

*Based on 35 test plots and 40 control plots
C.L. = Confidence Level
N.S. = Not Significant

TABLE 3

| | FIELD PENETRATION | | | | |
|---|---|---|---|---|---|
| STRAIN | AVG. DIAL* | STAN. DEV. | AVG. FORCE* LBS. | C.L. | AVG. MOIST. CONTENT* |
| CONTROL | 109 | 22 | 36 | — | 12.2 |
| C-1 | 126 | 28 | 41 | 99% | 12.9 |
| BG-1 | 168 | 44 | 55 | 99.9% | 16.7 |
| BG-2 | 111 | 31 | 37 | N.S. | 14.2 |
| C-2 | 118 | 37 | 99 | 90% | 13.4 |
| BG-3 | 107 | 29 | 35 | N.S. | 12.4 |

*Based on 35 test plots and 40 control plots
C.L. = Confidence Level
N.S. = Not Significant

EXAMPLE 4

Viability of Resting Stage Algae in Compositions of the Invention

Purpose

The purpose of this experiment was to test the survival of two algal species after mixing with a dry, water dispersible carrier.

Methods

Algae were combined with several different dry, water dispersible carriers according to the method of Example 1 and assayed for survival on agar plates. A cyanophyte, *Nostoc commune,* and a chlorophyte, *Chlorella pyrenoidosa,* were mixed with several dry, water dispersible powders. *Nostoc commune* alone, *Chlorella prenoidosa* alone, and a mixture of the two were tested. The carriers were whey, guar gum, gum arabic, agar, malto dextrin, lactose, and clay.

Vegetative cells of each were concentrated from growing, active cultures by centrifugation and then sprayed-mixed with the dry carrier. A ratio of 99% carrier to 1% concentrated algae in a liquid slurry was used. All samples were air dried for 48 hours at 25° C.

Survival was tested by crumbling the dried mixture of algae and carrier onto nutrient agar plates replicated ten times. The plates were observed over 7 to 14 days.

Results

Results are presented in Tables 4, 5, and 6. Survival after mixing and drying of both algal strains, separately and together, showed success with guar gum, gum arabic, agar, malto dextrin, lactose, and clay. Microscopic analysis verified the survival and growth was of the original species dried and tested. Visible growth of the cyanophyte was slower than the chlorophyte.

Conclusion

The method of using a mixture of dry, water dispersible material and vegetative algal cells to dry and preserve the algal cells was tested and found effective. Survival and growth after the dry, flowable composition was formed was documented by plating onto nutrient agar and observing over 7 to 14 days.

TABLE 4

Survival and Growth on Agar of
*N. commune* Mixed with Various Carriers

| Carrier | Survival (Ten replicates on agar) |
|---|---|
| Whey | Confounded with heavy bacterial growth |
| Guar gum | 9/10 |
| Gum arabic | 9/10 |
| Agar | 10/10 |
| Malto dextrin | 8/10 |
| Lactose | 9/10 |
| Clay | 10/10 |

TABLE 5

Survival and Growth on Agar of
*C. pyrenoidosa* Mixed with Various Carriers

| Carrier | Survival (Ten replicates on agar) |
|---|---|
| Whey | 0/10 |
| Guar gum | 8/10 |
| Gum arabic | 9/10 |
| Agar | 10/10 |
| Malto dextrin | 9/10 |
| Lactose | 10/10 |
| Clay | 10/10 |

TABLE 6

Survival and Growth on Agar of *N. commune*
and *C. pyrenoidosa* Mixed with Various Carriers

| Carrier | Survival (Ten replicates on agar) | |
|---|---|---|
| | *N. commune* | *C. pyrenoidosa* |
| Whey | confounded with bacterial growth and mold | |
| Guar gum | 8/10 | 8/10 |
| Agar | 9/10 | 8/10 |
| Malto dextrin | 9/10 | 9/10 |
| Lactose | 9/10 | 8/10 |
| Clay | 10/10 | 10/10 |

EXAMPLE 5

Application of Vegetative Stage Algae to Soil

Purpose

The purpose of this experiment was to test the teaching of the prior art that, when the vegetative stage algae are applied to the soil surface, nitrogen must be added to the surface and then be allowed to deplete before significant amounts of flocculants would be produced.

Materials and Sample Preparation

Algal Cover Crop

An algae suspension was prepared, comprising *Chlamydomonas mexicana* equal to 80% of the total cell count per ml and *Nostoc commune* equal to 20% of the cell count per ml. It contained a minimum of $10^7$ total cells per ml.

The field plots studied herein were sprayed with a hand sprayer in November of the first year and March of the following (second) year at a concentration of approximately one quart of suspension with twenty gallons of water per acre. This provided approximately $10^{10}$ cells per acre. The surface 1-inch was sampled in May of the second year. No nitrogen or other nutrients were added.

Field Plots

One level acre was leased. In the two years immediately before the initial spraying, it had been planted with corn, and in the three preceding years with alfalfa and orchard grass. The ground was subdivided into twenty 10-foot by 50-foot test plots with intervening 10-foot buffer zones seeded with rye to prevent lateral migration of algae from treated plots to to control plots. Textures of all plots were determined by A & L Mid West Agricultural Laboratories, Inc., Omaha, NE, and plots were paired based on their textures to eliminate that variable. This study compared Plot 2 (treated, with 30% sand, 55% silt, and 15% clay) with Plot 5 (control, with 30% sand, 53% silt, and 17% clay). The soil was rototilled in the autumn and left bare except for weeds. No fertilizers or chemicals were applied.

Sample Preparation

Bulk samples were assembled from trowel scoops taken randomly over each plot. In the laboratory, they were spread and air dried for 72 hours and then gently crushed with a rubber mallet. The soil was screened by hand in 8-inch brass wire sieves into two fractions: (1) all material passing a 2.00 mm sieve and (2) material passing a 2.00 sieve mm but retained on a 1.00 mm sieve. The samples were stored in closed polyethelene buckets.

Test Methods

Wet Aggregate Stability

The method used for determining wet aggregate stability was the same as in Example 3.

Modulus of Rupture

The method used to determine modulus of rupture was the same as in Example 3.

Field Penetration

The plots were tested in May of the second year with a Soiltest Proving Ring Penetrometer. This device was a 5-inch diameter steel proving ring with 0.0001-inch guage to measure the force required to push a 2-inch long conical steel point into the soil. The point's angle was 30 degrees and the diameter at the top was one inch. Twenty probings were made at the depth of the steel point in both control and treated plots, including both high and low areas of the micro-terrain. The moisture content was slightly less than field capacity. Soybean Emergence A pair of $10' \times 50'$ plots (plots 15 and 16) at the same site, which also had been treated twice with the cover crop (November of the first year and March of the second year), was rototilled. Twenty-four planter boxes, four-feet square were built of $1'' \times 6''$ lumber and set into the soil. The textural analysis on Plots 15 and 16 were identical at 16% sand, 64% silt, and 20% clay. A crust was formed by applying one inch of water. Subsequent alternating rain and sun formed a ½-inch crust. Twelve soybean seeds per box were planted at a measure of depth of 1.5 inches 12-inches apart with minimum disruption of the crust, which was then re-formed by watering. One hundred forty-four seeds each of two varieties were planted. The Stine 3560 of Adel, Iowa has the highest emergence rating of "1" and the Williams 82 seed of Oskaloosa, Iowa has the poorest rating of "5" on a scale of one to five. The emerging plants were tallied several times per week.

Results and Discussion

The three physical properties tests showed significant differences between treated and control plots, Table 7. The treated soils produced a higher percent of water stable aggregates which is favorable to most crops because it causes generally higher infiltration rates and aeration as well as reduced erosion. The modulus of rupture of the treated soil was significantly lower than the control, indicating less potential for hard surface crusting and clod formation upon drying. The field penetration test confirmed the modulus of rupture test in pointing to a softer soil surface.

After nine days, soybeans planted in treated soil had a significantly higher percent emergence than seeds planted in control soil. Table 8 contains the results at 21 days and shows the greater relative benefit to the weaker emerging seed, Williams 82.

The above results suggest this algal cover crop improves the aggregation of Midwestern clay soils. The results further demonstrate that, contrary to the teaching of the prior art, it was not necessary to add nitrogen to the soil and then allow the nitrogen to deplete for the algal cover crop to produce a sufficient amount of flocculants to improve soil aggregation.

TABLE 7

Results of Tests on Field Plots Treated With Algal Cover Crop vs. Matched Controls

| Test | Treated (T) Control (C) | # of Repetitions | Mean | Standard Deviation | Confidence Level* |
| --- | --- | --- | --- | --- | --- |
| Wet Aggregate | T | 9 | 46.0% | 4.2% | 95% |
| Stability | C | 9 | 35.8% | 6.7% | |
| Modulus of | T | 7 | $3.55 \times 10^5$ dynes/cm$^2$ | 0.27 | 95% |
| Rupture | C | 7 | $4.52 \times 10^5$ dynes/cm$^2$ | 0.22 | |
| Field Pene- | T | 20 | 94 lbs. | 14 lbs. | 95% |
| tation | C | 20 | 103 lbs. | 13 lbs. | |

*2-tailed t-test

TABLE 8

Soybean Emergence Through Soil Crust

| Soybean Variety | Row. no (Sum of 4 planter boxes) | Percent Emergence at 21 Days | | Confidence Level* |
| --- | --- | --- | --- | --- |
| | | Treated | Control | |
| Stine 3560 | 1 | 83 | 81 | 90% |
| | 2 | 75 | 67 | |
| | 3 | 83 | 75 | |
| Williams 82 | 4 | 81 | 48 | 90% |
| | 5 | 75 | 67 | |
| | 6 | 77 | 56 | |

*2-tailed t-test

It will be apparent to those skilled in the art that modifications and variations can be made to the products and processes of the present invention. Thus, it is intended that the present invention cover the modifications and variations of this invention, provided they come within the scope of the appended claims and their equivalents.

What is claimed is:

1. A method for the production of a dry, flowable, and water suspendible microbial composition comprising the steps of:
   growing flocculant-producing photosynthetic microorganisms in a nutrient-containing medium; and
   inducing a resting stage in said microorganisms by mixing said microorganisms with a dry, particulate, water dispersible carrier to produce said dry, flowable, and water suspendible microbial composition wherein said carrier comprises particles, substantially all of which have a diameter less than 0.05 mm.

2. The method of claim 1 wherein said photosynthetic microorganisms are algae.

3. The method of claim 2 wherein said algae is a strain selected from the genera Chlamydomonas, Chlorella, Nostoc, Oscillatoria, Aphanocapsa, Aphanothece, Schizothrix, or Microcoleus.

4. The method of claim 2 wherein said algae is a strain selected from the genera Chlamydomonas, Chlorella, Oscillatoria, Aphanocapsa, Aphanothece, Schizothrix, or Microcoleus.

5. The method of claim 2 wherein said algae are green algae.

6. The method of claim 2 wherein said step of inducing a resting stage in said algae comprises spraying said algae onto a dispersion of said dry, particulate, water dispersible carrier while mixing said algae with said carrier.

7. The method of claim 6 wherein said algae is mixed with said carrier at a ratio of approximately 1-5% by volume of algae to approximately 99-95% by volume of carrier

* * * * *